United States Patent
Hong et al.

(10) Patent No.: US 10,419,591 B2
(45) Date of Patent: Sep. 17, 2019

(54) ELECTRONIC DEVICE AND METHOD FOR CONTROLLING RADIO FREQUENCY INTERFERENCE

(71) Applicant: Samsung Electronics Co., Ltd., Gyeonggi-do (KR)

(72) Inventors: Eun Seok Hong, Gyeonggi-do (KR); Yong Hoi Kwon, Gyeonggi-do (KR); Duck Jin Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 15/206,967

(22) Filed: Jul. 11, 2016

(65) Prior Publication Data

US 2017/0013629 A1    Jan. 12, 2017

(30) Foreign Application Priority Data

Jul. 9, 2015  (KR) .................. 10-2015-0097825

(51) Int. Cl.
    *H04W 72/08*    (2009.01)
    *H04M 1/725*    (2006.01)
    *H04B 15/00*    (2006.01)

(52) U.S. Cl.
    CPC ........ *H04M 1/72527* (2013.01); *H04B 15/00* (2013.01); *H04M 1/72519* (2013.01)

(58) Field of Classification Search
    None
    See application file for complete search history.

(56) References Cited

U.S. PATENT DOCUMENTS

| | | | |
|---|---|---|---|
| 4,349,916 A * | 9/1982 | Roeder | H04B 1/123 327/553 |
| 4,563,651 A * | 1/1986 | Ohta | H03G 5/24 329/318 |
| 6,959,056 B2 | 10/2005 | Yeap et al. | |
| 7,848,463 B2 * | 12/2010 | Li | H04L 25/0232 370/208 |
| 9,042,432 B2 * | 5/2015 | Werner | H04B 3/54 370/329 |
| 2001/0050987 A1 | 12/2001 | Yeap et al. | |
| 2002/0167372 A1 * | 11/2002 | Ishizaki | H01P 1/2135 333/17.1 |
| 2009/0098828 A1 * | 4/2009 | Furman | H04B 1/1027 455/63.1 |
| 2009/0175244 A1 * | 7/2009 | Schilling | H04B 1/71 370/335 |
| 2013/0010627 A1 * | 1/2013 | Abdelmonem | H04B 1/1036 370/252 |
| 2013/0155941 A1 * | 6/2013 | Fujimura | H04J 1/05 370/315 |
| 2014/0314002 A1 * | 10/2014 | Hanson | H04B 7/026 370/329 |
| 2015/0234404 A1 * | 8/2015 | Agarwal | G05F 1/575 323/273 |

* cited by examiner

*Primary Examiner* — Kenny S Lin
(74) *Attorney, Agent, or Firm* — The Farrell Law Firm, P.C.

(57) ABSTRACT

An electronic device is provided. The electronic device includes a communication module, a first processor and a second processor, and a plurality of filters. The first processor identifies a frequency band corresponding to the network, and the second processor receives information on the frequency band from the first processor and determines a filter to be used among the plurality of filters based on the information.

11 Claims, 14 Drawing Sheets

ELECTRONIC DEVICE AND METHOD FOR CONTROLLING RADIO FREQUENCY INTERFERENCE

PRIORITY

This application claims priority under 35 U.S.C. § 119(a) to Korean Patent Application Serial No. 10-2015-0097825, which was filed on Jul. 9, 2015, in the Korean Intellectual Property Office, the entire content of which is incorporated herein by reference.

BACKGROUND

1. Field of the Disclosure

The present disclosure generally relates to an electronic device and method, and more particularly, to an electronic device and method for controlling radio frequency interference.

2. Description of the Related Art

With the development of information communication technology, a network device such as a base station and an electronic device allows a user to use a network anywhere in the country by transmitting/receiving data to/from another electronic device through the network.

Various kinds of electronic devices provide various functions according to recent digital convergence trends. For example, in addition to a call function, smartphones support Internet access functions by using network, music or video playback functions, and picture and video capturing functions by using an image sensor.

Additionally, smartphones may transmit/receive data when connected to external devices, for example, computers or mobile storage media. For example, smartphones may retrieve and use music files and picture files stored in computers or mobile storage media. On the other hand, music files and picture files stored in smartphones may be stored in computers or mobile storage media.

SUMMARY

Accordingly, an aspect of the present disclosure is to provide an electronic device and method for removing frequency interference, which occurs when a wireless network is used, through a filter.

In accordance with an aspect of the present disclosure, an electronic device includes a communication module configured to perform network communication, a first processor and a second processor electrically connected to the communication module, and a plurality of filters electrically connected to the first processor and the second processor, wherein the first processor identifies a frequency band corresponding to the network, and wherein the second processor receives information on the frequency band from the first processor and determines a filter to be used among the plurality of filters based on the information.

In accordance with another aspect of the present disclosure, a method of an electronic device to control radio frequency interference is provided which includes performing network communication, identifying, by a first processor, a frequency band corresponding to the network, receiving, by a second processor, information on the frequency band from the first processor, and determining, by the second processor, a filter to be used among a plurality of filters based on the information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
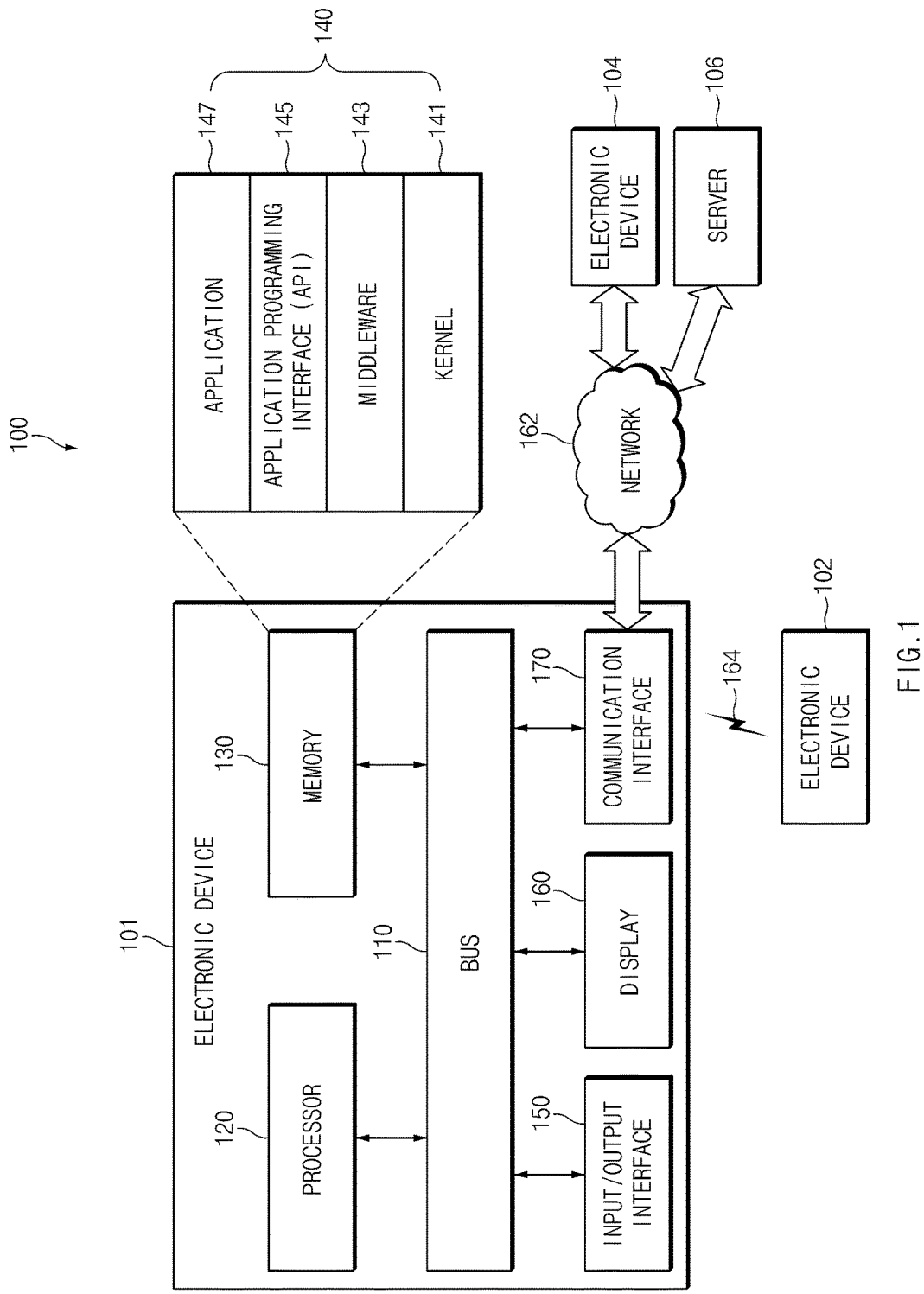
FIG. 1 illustrates an electronic device in a network environment, according to an embodiment of the present disclosure.

Hereinafter, various embodiments of the present disclosure are disclosed with reference to the accompanying drawings. However, the present disclosure is not limited to a specific embodiment and it is intended that the present disclosure covers all modifications, equivalents, and/or alternatives of the present disclosure within the scope of the appended claims and their equivalents. With respect to the descriptions of the accompanying drawings, like reference numerals refer to like elements.

The terms and words used in the following description and claims are not limited to their dictionary meanings, but are used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural forms as well unless the context clearly dictates otherwise. Thus, for example, reference to "a component surface" includes reference to one or more of such surfaces.

The terms "include," "comprise," and "have", or "may include," or "may comprise" and "may have" used herein indicate disclosed functions, operations, or existence of elements, but do not exclude other functions, operations or elements.

For example, the expressions "A or B," or "at least one of A and/or B" may indicate A and B, A, or B. For instance, the expressions "A or B" or "at least one of A and/or B" may indicate (1) at least one A, (2) at least one B, or (3) both at least one A and at least one B.

Terms such as "1st," "2nd," "first," "second," and the like, used herein may refer to modifying various elements of various embodiments of the present disclosure, but are not intended to limit the elements. For instance, "a first user device" and "a second user device" may indicate different user devices regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but do not limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, eyeglasses, a contact lens, a head-mounted device (HDM)), a textile or clothing integrated type device (e.g., an electronic apparel), a body attached type device (e.g., a skin pad or a tattoo), or a bio implantable type device (e.g., an implantable circuit)

In an embodiment of the present disclosure, an electronic device may be a home appliance. The smart home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In an embodiment of the present disclosure, an electronic device may include at least one of various medical devices (e.g., various portable medical measurement devices (e.g., a blood glucose measuring device, a heart rate measuring device, a blood pressure measuring device, a body temperature measuring device, and the like), a magnetic resonance angiography (MRA), a magnetic resonance imaging (MRI), a computed tomography (CT), a scanner, an ultrasonic device, and the like), a navigation device, a global navigation satellite system (GNSS), an event data recorder (EDR), a flight data recorder (FDR), a vehicle infotainment device, electronic equipment for vessels (e.g., a navigation system, a gyrocompass, and the like), avionics, a security device, a head unit for a vehicle, an industrial or home robot, an automatic teller machine (ATM), a point of sales (POS) terminal, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, and the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, and the like). An electronic device may be one or more combinations of the above-mentioned devices. An electronic device may be a flexible device. An electronic device is not limited to the above-mentioned devices, and may include new electronic devices according to the development of new technology.

Hereinafter, an electronic device according to various embodiment of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

An electronic device 101 in a network environment 100 according to various embodiments of the present disclosure will be described with reference to FIG. 1. The electronic device 101 includes a bus 110, a processor 120, a memory 130, an input/output interface 150, a display 160, and a communication interface 170. At least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 includes, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, and the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, and the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, and the like.

The input/output interface 150 may serve to transfer an instruction or data input from a user or another external device to other element(s) of the electronic device 101. Furthermore, the input/output interface 150 may output instructions or data received from other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, and the like) to the user. The display 160 may include a touch screen, and may receive a touch, gesture, proximity or hovering input from an electronic pen or a part of a body of the user.

The communication interface 170 may set communications between the electronic device 101 and a first external electronic device 102, a second external electronic device 104, or a server 106. For example, the communication interface 170 may be connected to a network 162 via wireless communications or wired communications so as to communicate with the external device 104 or the server 106.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of wireless fidelity (Wi-Fi), Bluetooth, near field communication (NFC), or GNSS. The GNSS may include, for example, at least one of global positioning system (GPS), global navigation satellite system (Glonass), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), and the like. The network 162 may include at least one of telecommunications networks, for example, a computer network (e.g., a LAN or WAN), the Internet, or a telephone network.

The types of the first external electronic device 102 and the second external electronic device 104 may be the same as, or different from, the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from the first electronic device 102, the second external electronic device 104, or the server 106 instead of, or in addition to, performing the function or service for itself. The first electronic device 102, the second external electronic device 104, or the server 106 may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
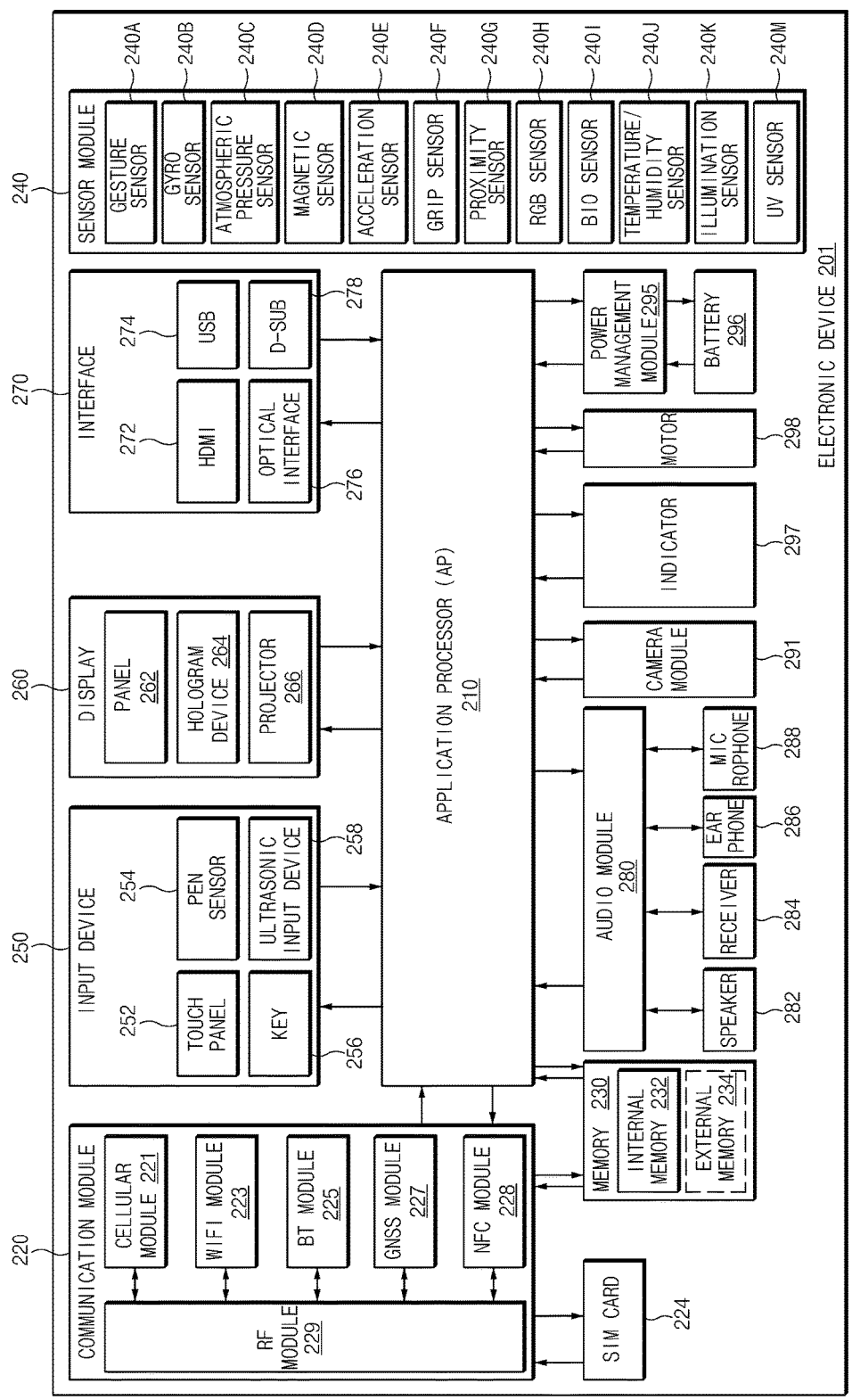
FIG. 2 is a block diagram illustrating an electronic device, according to an embodiment of the present disclosure.

FIG. 2 is a block diagram illustrating an electronic device according to an embodiment of the present disclosure.

Referring to FIG. 2, an electronic device 201 may include, for example, a part or the entire electronic device 101 illustrated in FIG. 1. The electronic device 201 includes at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as, or similar to, that of the communication interface 170 of FIG. 1. The communication module 220 may include, for example, a cellular module 221 (e.g., the modem 330), a Wi-Fi module 223, a Bluetooth module 225, a GNSS module 227 (e.g., a GPS module, a Glonass module, a BeiDou module, or a Galileo module), an NFC module 228, and a radio frequency (RF) module 229.

The cellular module 221 may provide, for example, a voice call service, a video call service, a text message service, or an Internet access service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP).

Each of the Wi-Fi module 223, the Bluetooth module 225, the GNSS module 227 and the NFC module 228 may include, for example, a processor for processing data transmitted/received through the modules. According to various embodiments of the present disclosure, at least a part (e.g., two or more) of the cellular module 221, the Wi-Fi module 223, the Bluetooth module 225, the GNSS module 227, and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, and the like. According to another embodiment of the present disclosure, at least one of the cellular module 221, the Wi-Fi module 223, the Bluetooth module 225, the GNSS module 227, or the NFC module 228 may transmit/receive RF signals through a separate RF module.

The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) includes, for example, an internal memory 232 or an external memory 234. The internal memory 232 may include at least one of a volatile memory (e.g., a dynamic RAM (DRAM), a static RAM (SRAM), a synchronous dynamic RAM (SDRAM), and the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, and the like)), a hard drive, or a solid state drive (SSD).

The external memory 234 may include a flash drive such as a compact flash (CF), a secure digital (SD), a micro-SD, a mini-SD, an extreme digital (xD), a multimedia card (MMC), a memory stick, and the like. The external memory 234 may be operatively and/or physically connected to the electronic device 201 through various interfaces.

The sensor module 240 may, for example, measure physical quantity or detect an operation state of the electronic device 201 so as to convert measured or detected information into an electrical signal. The sensor module 240 includes, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for input recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, and the like. An additional circuit for wireless charging, such as a coil loop, a resonant circuit, a rectifier, and the like, may be further included. The battery gauge may measure, for example, a remaining charge capacity of the battery 296 and a voltage, current or temperature thereof while the battery is charged.

The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration, and may generate a vibration or haptic effect. A processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, and the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 3:
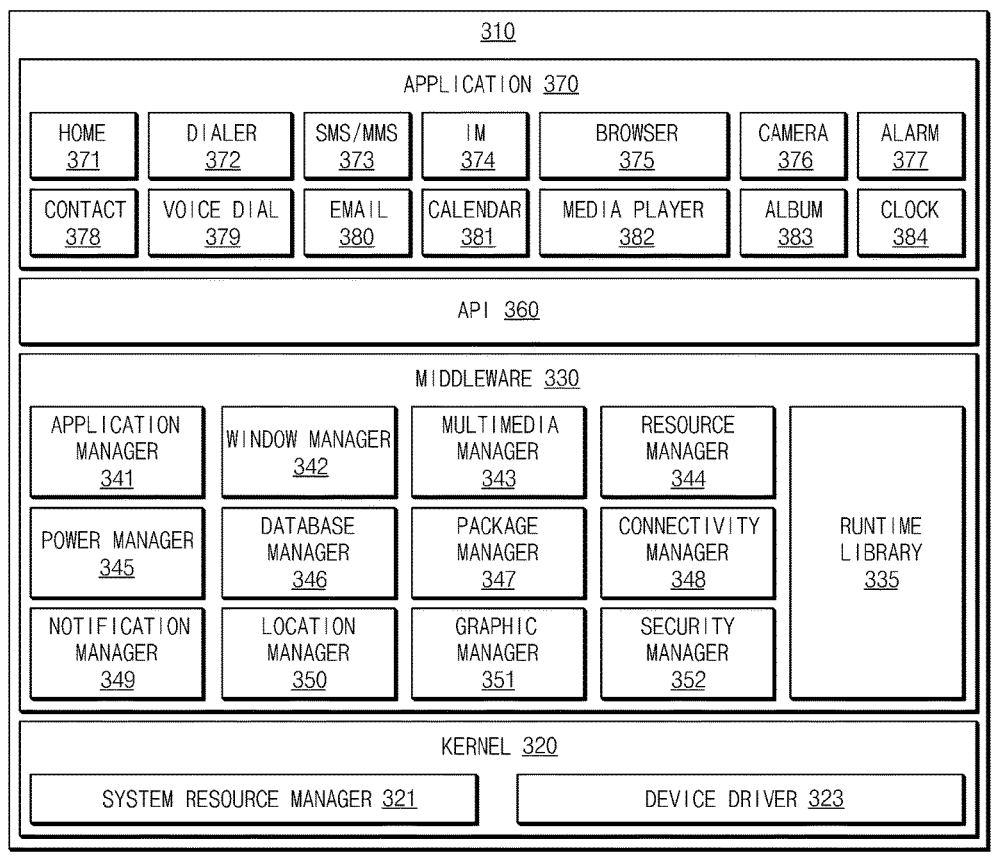
FIG. 3 is a block diagram illustrating a program module, according to an embodiment of the present disclosure.

FIG. 3 is a block diagram illustrating a program module according to an embodiment of the present disclosure.

Referring to FIG. 3, a program module 310 (e.g., the program 140) may include an operating system (OS) for controlling a resource related to an electronic device (e.g., the electronic device 101) and/or various applications (e.g., the application program 147) running on the OS. The operating system may be, for example, Android, iOS, Windows, Symbian, Tizen, and the like.

The program module 310 includes a kernel 320, a middleware 330, an API 360, and/or an application 370. At least a part of the program module 310 may be preloaded on an electronic device or may be downloaded from an external electronic device 102, 104, or the server 106.

The kernel 320 (e.g., the kernel 141) includes, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power supply and may provide power information required for operating the electronic device. The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, and the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device 101 includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., provide air pressure, humidity, or temperature information).

According to an embodiment of the present disclosure, the application 370 may include an information exchange application for supporting information exchange between the electronic device 101 and an external electronic device 102 or the second external electronic device 104. The information exchange application may include, for example, a notification relay application for relaying specific information to the external electronic device or a device management application for managing the external electronic device.

For example, the notification relay application may have a function for relaying, to an external electronic device 102 or the second external electronic device 104, notification information generated in another application (e.g., an SMS/MMS application, an e-mail application, a health care application, an environmental information application, and the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device 102 or the second external electronic device 104, communicating with the electronic device, an application running in the external electronic device, or a service (e.g., a call service, a message service, and the like) provided from the external electronic device.

According to an embodiment of the present disclosure, the application 370 may include a specified application (e.g., a healthcare application of a mobile medical device) according to an attribute of the external electronic device 102 or the second external electronic device 104. The application 370 may include an application received from an external electronic device 102 or the second external electronic device 104. The application 370 may include a preloaded application or a third-party application downloadable from a server. The names of the elements of the program module 310 illustrated may vary with the type of an operating system.

According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
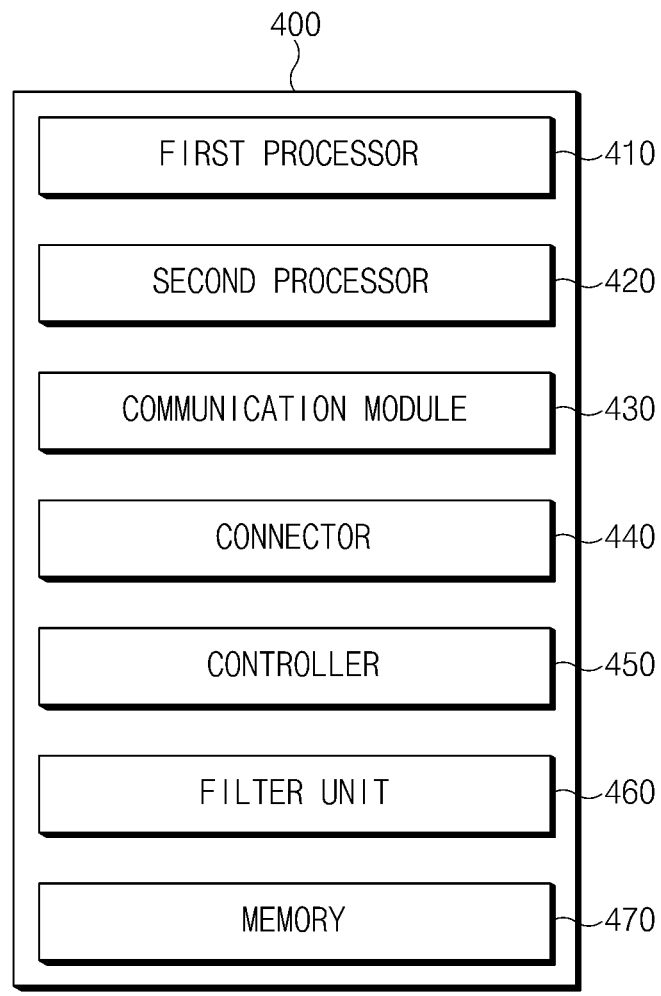
FIG. 4 is a block diagram illustrating an electronic device for controlling radio frequency interference, according to an embodiment of the present disclosure.

FIG. 4 is a block diagram illustrating an electronic device for controlling radio frequency interference, according to an embodiment of the present disclosure.

Referring to FIG. 4, an electronic device 400 includes a first processor 410, a second processor 420, a communication module 430, a connector 440, a controller 450, a filter unit 460, and a memory 470.

The configuration of the electronic device 400 shown in FIG. 4 is one implementation example of the present disclosure and various modifications are possible. For example, the electronic device 400 may further include a user interface for receiving an instruction or information from a user. The user interface may be an input device such as a keyboard, a mouse, and may be a graphical user interface (GUI) displayed on the screen of the electronic device 400.

Hereinafter, as an example, the first processor 410 may be described as an example of a communication processor (CP) and the second processor 420 may be described as an example of an application processor (AP). Although it is described with reference to FIG. 2 that the CP is included in the cellular module 221, according to an embodiment of the present disclosure, the CP may serve as a processor for each network that is available for the communication module 220 as included in the communication module 220.

According to an embodiment of the present disclosure, the first processor 410 may identify a frequency band corresponding to a network communication being performed in the communication module 430. Additionally, the first processor 410 may notify the identified frequency band to the second processor 420.

The second processor 420 may determine a filter to be used among a plurality of filters included in the filter unit 460, based on the notified frequency band. Each of the plurality of filters in the filter unit 460 may be a band stop filter. For example, the plurality of filters may include a high frequency band stop filter, a middle frequency band stop filter, and a low frequency band stop filter. Each of the band stop filters is described with reference to FIGS. 5 to 7. The filter may be implemented with a resistor-capacitor (RC) filter. Additionally, the filter may be designed through a lumped element, a lumped element and an inverter, a stub-connected transmission line, or a coupled line.

The second processor 420 may make a determination to use the filter when an external device is connected to the connector 440. The connector 440 may correspond to the input/output interface 150 of FIG. 1 or the interface 270 of FIG. 2. The external device may be a desktop, a laptop, a mobile storage medium (for example, USB and memory), or another smartphone.

The second processor 420 may make a determination to use the filter when transmitting/receiving data to/from the connected external device at more than a 5 Gbps transfer rate. For example, when the electronic device 400 and the external device are connected through the connector 440 and data is transmitted or received at a high transfer rate through USB 3.0 mode or mobile industry processor interface (MIPI) mode, a determination is made on whether to use a filter. For example, the second processor 420 may determine whether to use the filter according to the type of the external device.

When a connection with the external device through the connector 440 is released, the second processor 420 may determine to stop using a filter.

The communication module 430 may perform network communication. The communication module 430 may correspond to the communication module 220 of FIG. 2. As described with reference to FIG. 2, the communication module 220, for example, may include a cellular module 221, a Wi-Fi module 223, a BT module 225, a GNSS module 227 (for example, a GPS module, a Glonass module, a Beidou module, or a Galileo module), an NFC module 228, and a radio frequency (RF) module 229. That is, the communication module 430 may use at least two networks at the same time substantially (for example, including a case of a time-division duplex (TDD) communication method). Accordingly, the second processor 420 may make a determination to use two or more filters.

The second processor 420 may determine whether to change a filter based on only a change in the frequency band. For example, even when a connection with the external device through the connector 440 is released, if there is no change in a frequency band in use, the second processor 420 may continuously use a filter.

A frequency band used in the communication module 430 may be changed. For example, when using cellular network for receiving data, the electronic device 400 may use a Wi-Fi network. The first processor 410 may provide (or notify) information on a frequency band corresponding to the changed network to the second processor 420. Additionally, the second processor 420 may determine a filter appropriate for the newly-notified frequency band.

The controller 450 may receive the filter determination from the second processor 420. For example, the controller 450 may receive information on a filter that the second processor 420 makes a determination to use. The controller 450 may connect a switch to the determined filter in order to use a filter according to the determination based on the received information. If a filter that the second processor 420 makes a determination to use is plural, the controller 450 may connect a switch in parallel with each of the plurality of filters. The plurality of filters connected in parallel may operate as a cascade filter.

The memory 470 may store data, for example, instructions for operations performed by the first processor 410 and the second processor 420. Data stored in the memory 470 includes data inputted and outputted between each of components in the electronic device 400 and/or data inputted and outputted between the electronic device 400 and components outside the electronic device 400.

Figure 5:
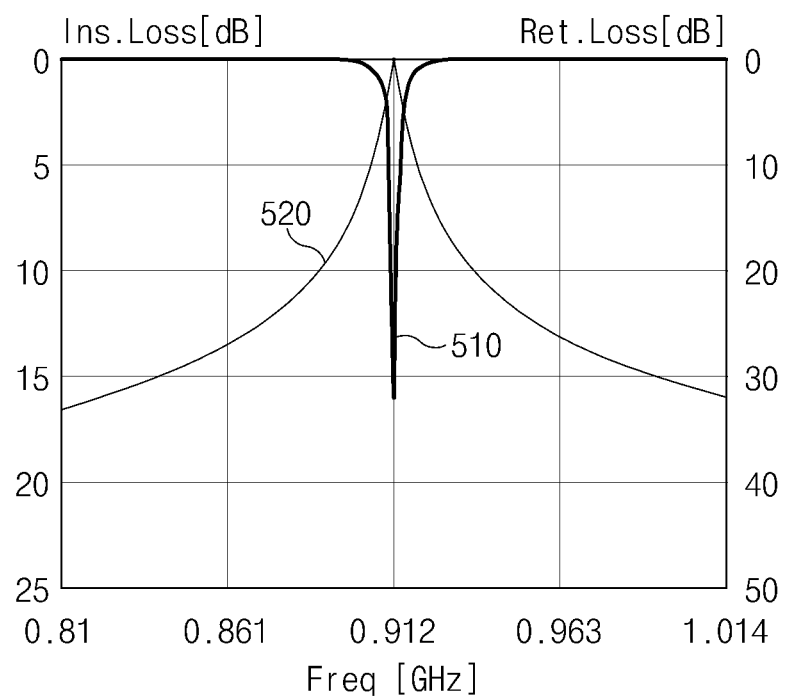
FIG. 5 illustrates a filter used for controlling radio frequency interference in an electronic device and a characteristic graph of the filter, according to an embodiment of the present disclosure.
Figure 6:
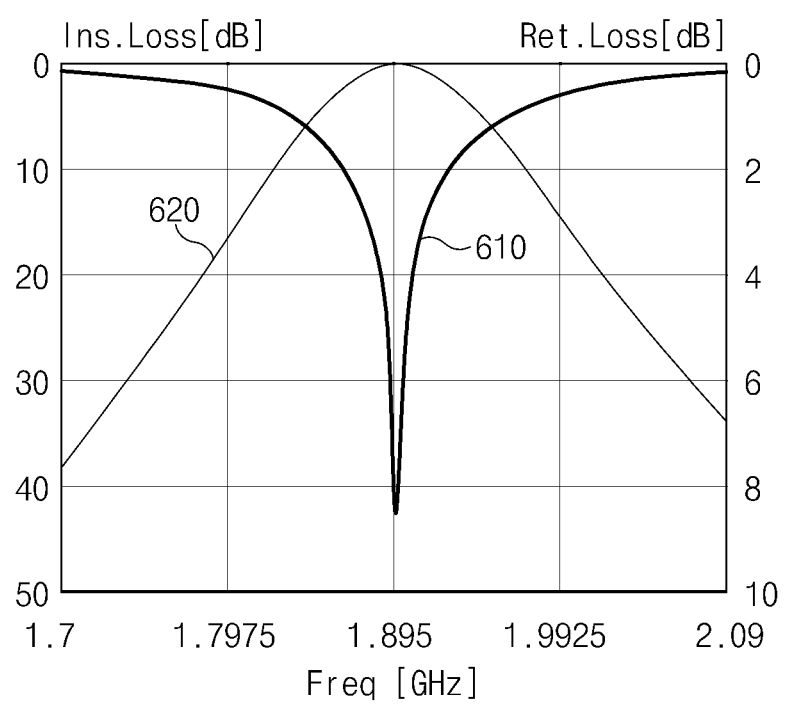
FIG. 6 illustrates another filter used for controlling radio frequency interference in an electronic device and a characteristic graph of the filter, according to an embodiment of the present disclosure.
Figure 7:
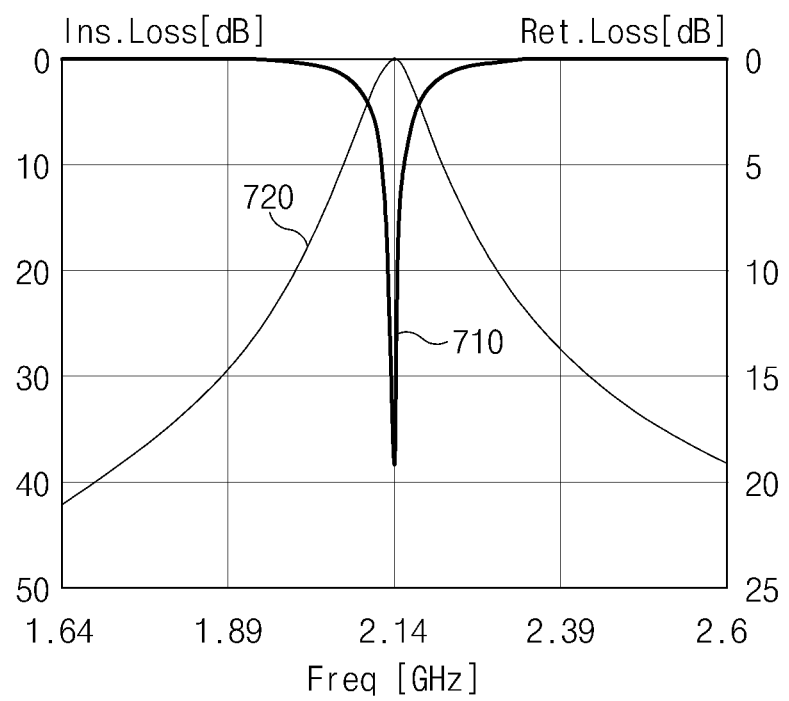
FIG. 7 illustrates another filter used for controlling radio frequency interference in an electronic device and a characteristic graph of the filter according to an embodiment of the present disclosure.

FIGS. 5 to 7 illustrate filters used for controlling radio frequency interference in an electronic device and a characteristic graph of the filter, according to an embodiment of the present disclosure.

Each filter having characteristics of a graph shown in FIGS. 5 to 7 may be a low frequency band stop filter (see FIG. 5), a middle frequency band stop filter (see FIG. 6), or a high frequency band stop filter (see FIG. 7). Additionally, a filter corresponding to each of FIGS. 5 to 7 may be implemented with an RC circuit.

A frequency characteristic graph for each filter is shown in FIGS. 5 to 7. Each of graphs 510, 610, and 710 in FIGS. 5 to 7 respectively represents the insertion loss (dB) of a filter and each of graphs 520, 620, and 720 in FIGS. 5 to 7 respectively represents the return loss (dB) of a filter.

The insertion loss is a value for displaying a transmission coefficient S21 in dB in an s-parameter. If a filter is analyzed using the insertion loss value, for example, based on −3 dB, the filter may pass a frequency in which the insertion loss is greater than −3 dB and less than 0 dB and may not pass a frequency in which the insertion loss is less than −3 dB. The return loss is a value for displaying a return coefficient S22 in dB. When a filter is analyzed using the return coefficient value, for example, the filter may block (or return) a corresponding frequency as the return coefficient is close to 0 dB and pass a corresponding frequency as the return coefficient is lower. If impedance matching is good, the return loss may be approximately −40 dB.

Referring to the graphs 510 and 520 of FIG. 5, since the filter of FIG. 5 has a low insertion loss and a high return loss in an approximately 0.91 GHz band, it may be a low frequency band stop filter for blocking a frequency in an approximately 0.91 GHz band. The filter of FIG. 5 may be designed by connecting a 0.1 nH inductor and a 330 pF capacitor in parallel. In this case, a bandwidth may be approximately 0.1 GHz.

Referring to the graphs 610 and 620 of FIG. 6, since the filter of FIG. 6 has a low insertion loss and a high return loss in an approximately 1.9 GHz band, it may be a middle frequency band stop filter for blocking a frequency in an approximately 1.9 GHz band. The filter of FIG. 6 may be designed by connecting a 0.8 nH inductor and an 8.3 pF capacitor in parallel. In this case, a bandwidth may be approximately 0.19 GHz.

Referring to the graphs 710 and 720 of FIG. 7, since the filter of FIG. 7 has a low insertion loss and a high return loss in an approximately 2.14 GHz band, it may be a high frequency band stop filter for blocking a frequency in an approximately 2.14 GHz band. The filter of FIG. 7 may be designed by connecting a 0.3 nH inductor and a 16 pF capacitor in parallel. In this case, a bandwidth may be approximately 0.1 GHz.

Each filter having the characteristics of the graphs shown in FIGS. 5 to 7 may be included in the filter unit 460 of the electronic device 400. However, according to various embodiments of the present disclosure, a filter included in the filter unit 460 may further include various filters in addition to the low frequency band stop filter, the middle frequency band stop filter, and the high frequency band stop filter of FIGS. 5 to 7.

Figure 8:
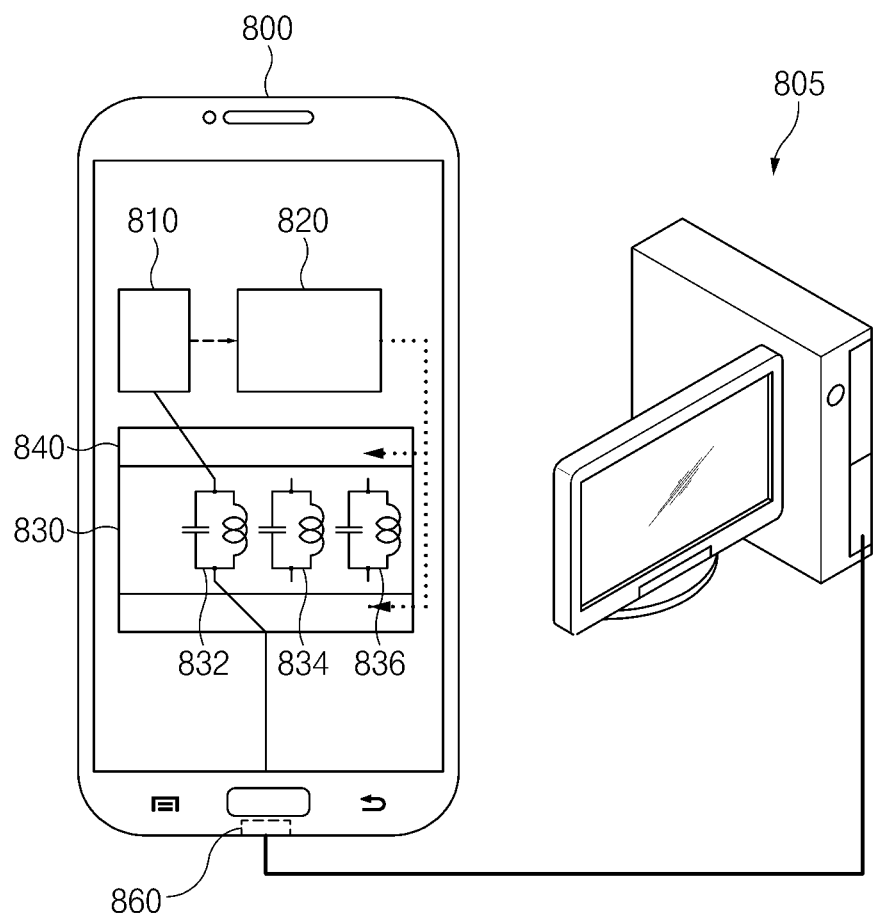
FIG. 8 illustrates an operation performed in an electronic device when an electronic device and an external device are connected to each other, according to an embodiment of the present disclosure.

FIG. 8 illustrates an operation performed in an electronic device when an electronic device and an external device are connected to each other according to an embodiment of the present disclosure.

Referring to FIG. 8, an electronic device 800 includes a first processor 810, a second processor 820, a filter unit 830, a controller 840, and a connector 860.

Referring to FIG. 8, the electronic device 800 is connected to an external device 805 through the connector 860. The connector 860 may be a USB 3.0 port, and the electronic device 800 may be connected to the external device 805 through a USB cable.

The USB 3.0 standard may be an interface for transmitting/receiving data at a transfer rate of more than 5 Gbps. In the case of a high-speed interface, a high frequency component is required for high clocking. Accordingly, a high frequency component generated by an operation of the high-speed interface may affect radio frequency (RF) performance, especially, the performance of a high frequency band.

The first processor 810 may identify a network or a network's frequency band, which the electronic device 800 uses, and notify it to the second processor 820. The second processor 820 may determine at least one of a first filter 832, a second filter 834, and a third filter 836 to be used, which are included in the filter unit 830. For example, the first filter 832 may be a low frequency band stop filter, the second filter 834 may be a middle frequency band stop filter, and the third filter 836 may be a high frequency band stop filter. Hereinafter, it is assumed and described that the second processor 820 determines the first filter 832 as a filter to be used.

The controller 840 may be notified of a filter that the second processor 820 determines, from the second processor 820. That is, the controller 840 may receive information on the filter from the second processor 820. The controller 840 may connect a switch to use the first filter 832 based on the notification (e.g., the information). The first filter 832 may be connected to the connector 860.

As mentioned with reference to FIG. 4, the second processor 820 may determine whether to use a filter based on whether data is transmitted at a high transfer rate through the USB cable. For example, even if the electronic device 800 is connected to the external device 805 through USB 3.0, the second processor 820 may make a determination not to use the filter when data is transmitted/received according to the USB 2.0 standard.

According an embodiment of the present disclosure, the second processor 820 may make a determination to use a filter only when network communication is performed.

FIGS. 9 to 12 are eye pattern graphs illustrating the degree of radio frequency interference when an electronic device does not use a filter, when a low frequency band stop filter is used, when a sub frequency band stop filter is used, and when a high frequency band stop filter is used.

The graphs shown in the upper portions of FIGS. 9 to 12 are eye pattern graphs (or eye diagrams) of high-speed signals (for example, high-speed signals of USB 3.0) through a connector and the graphs shown at the lower ends are power spectral graphs showing the characteristics of the time-specific eye pattern graphs by each frequency. Each graph of FIGS. 9 to 12 is a result obtained through the designer program of ANSYS, Inc. A filter corresponding to each graph of FIGS. 10 to 12 uses a Band Stop Filter registered by default in the program and each of an R value and a C value uses a value described with reference to FIGS. 5 to 7.

Figure 9A:
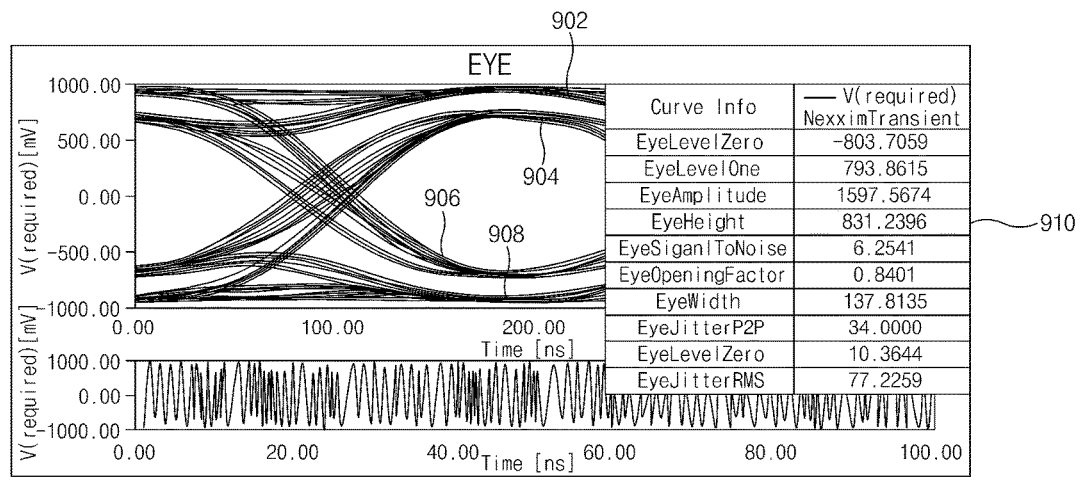
FIG. 9A is an eye pattern graph illustrating the degree of radio frequency interference when a filter is not used in an electronic device, according to an embodiment of the present disclosure.

FIG. 9A is an eye pattern graph illustrating the degree of radio frequency interference when a filter is not used in an electronic device, according to an embodiment of the present disclosure.

Figure 9B:
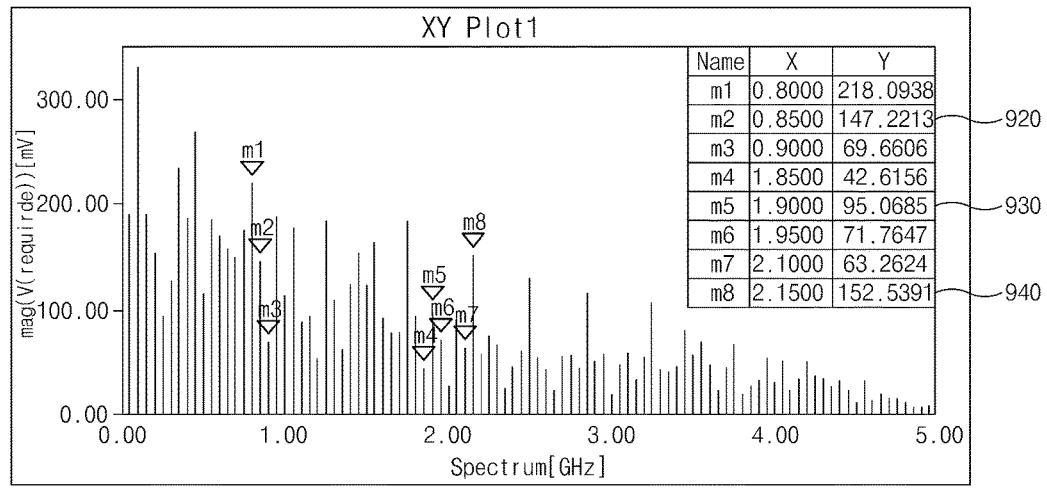
FIG. 9B is a power spectral density graph illustrating the degree of radio frequency interference when a filter is not used in an electronic device, according to an embodiment of the present disclosure.

FIG. 9B is a power spectral density graph illustrating the degree of radio frequency interference when a filter is not used in an electronic device, according to an embodiment of the present disclosure.

Referring to the reference numeral 910 of FIG. 9A, an eye height value of the eye pattern graph is approximately 831 mV.

Additionally, referring to FIG. 9A, in consideration that there is space between waveforms 902 and 904 of the eye pattern graph and space between waveforms 906 and 908, it may be determined that the signal is unstable.

Referring to the reference numerals 920, 930, and 940 of FIG. 9B, the high-speed signal has a value of approximately 147 mV at 0.85 GHz, a value of approximately 95 mV at 1.9 GHz, and a value of approximately 152 mV at 2.15 GHz.

Figure 10A:
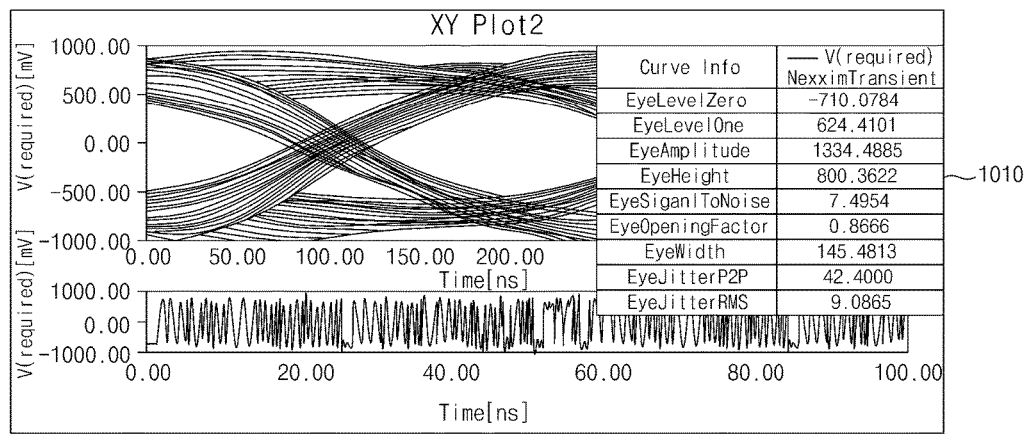
FIG. 10A is an eye pattern graph illustrating the degree of radio frequency interference when a low frequency band stop filter is used in an electronic device, according to an embodiment of the present disclosure.

FIG. 10A is an eye pattern graph illustrating the degree of radio frequency interference when a low frequency band stop filter is used in an electronic device, according to an embodiment of the present disclosure.

Figure 10B:
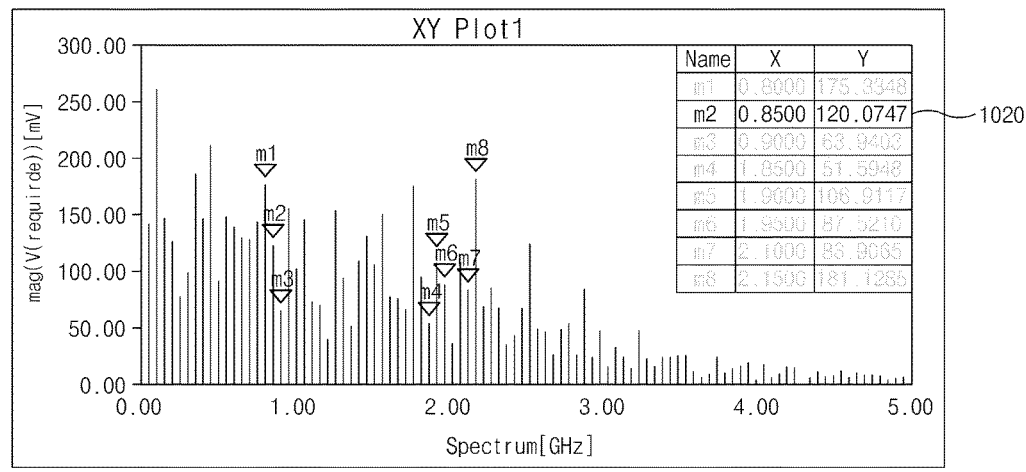
FIG. 10B is a power spectral density graph illustrating the degree of radio frequency interference when a low frequency band stop filter is used in an electronic device, according to an embodiment of the present disclosure.

FIG. 10B is a power spectral density graph illustrating the degree of radio frequency interference when a low frequency band stop filter is used in an electronic device, according to an embodiment of the present disclosure.

In the graph of a waveform of FIG. 10A, it may be seen that the high-speed signal is stable. Additionally, in relation to the high-speed signal, referring to the reference numeral 1010 of FIG. 10A, an eye height value of the eye pattern graph is approximately 800 mV, and referring to the reference numeral 1020 of FIG. 10B, an eye height value is approximately 120 mV at 0.85 GHz.

Accordingly, when a low frequency band stop filter is used, it may be seen that the filter reduces the size of the high-speed signal in a stable manner.

Figure 11A:
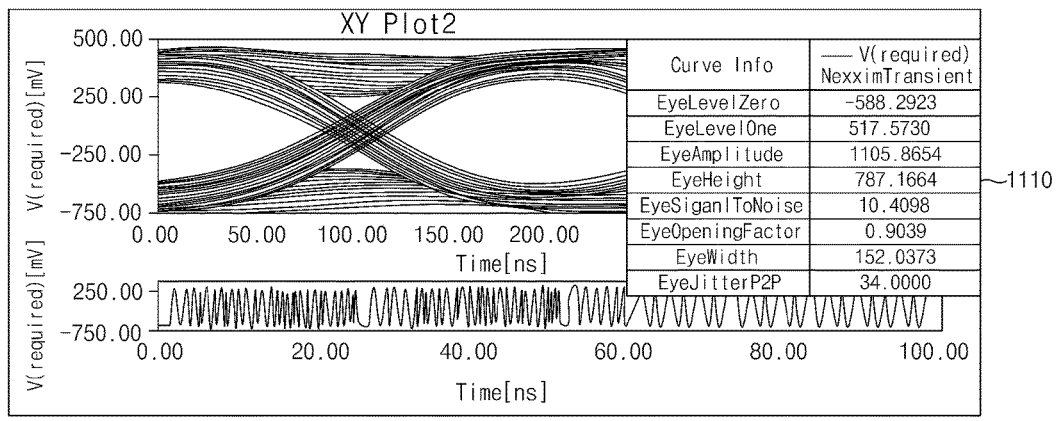
FIG. 11A is an eye pattern graph illustrating the degree of radio frequency interference when a middle frequency band stop filter is used in an electronic device, according to an embodiment of the present disclosure.

FIG. 11A is an eye pattern graph illustrating the degree of radio frequency interference when a middle frequency band stop filter is used in an electronic device, according to an embodiment of the present disclosure.

Figure 11B:
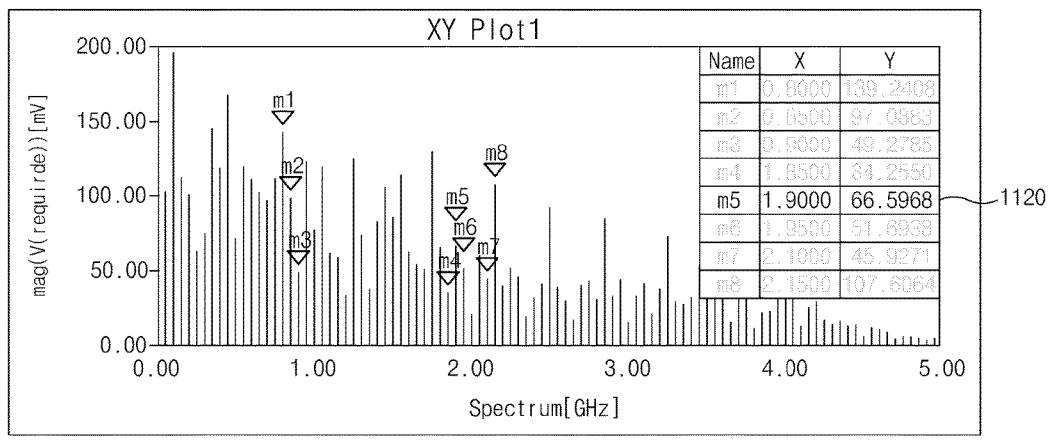
FIG. 11B is a power spectral density graph illustrating the degree of radio frequency interference when a middle frequency band stop filter is used in an electronic device, according to an embodiment of the present disclosure.

FIG. 11B is a power spectral density graph illustrating the degree of radio frequency interference when a middle frequency band stop filter is used in an electronic device, according to an embodiment of the present disclosure.

In the graph of a waveform of FIG. 11A, it may be seen that the high-speed signal is stable. Additionally, in relation to the high-speed signal, referring to the reference numeral 1110 of FIG. 11A, an eye height value of the eye pattern graph is approximately 787 mV, and referring to the reference numeral 1120 of FIG. 11B, an eye height value is approximately 66.6 mV at 1.9 GHz.

Accordingly, when a middle frequency band stop filter is used, it may be seen that the filter reduces the size of the high-speed signal in a stable manner.

Figure 12A:
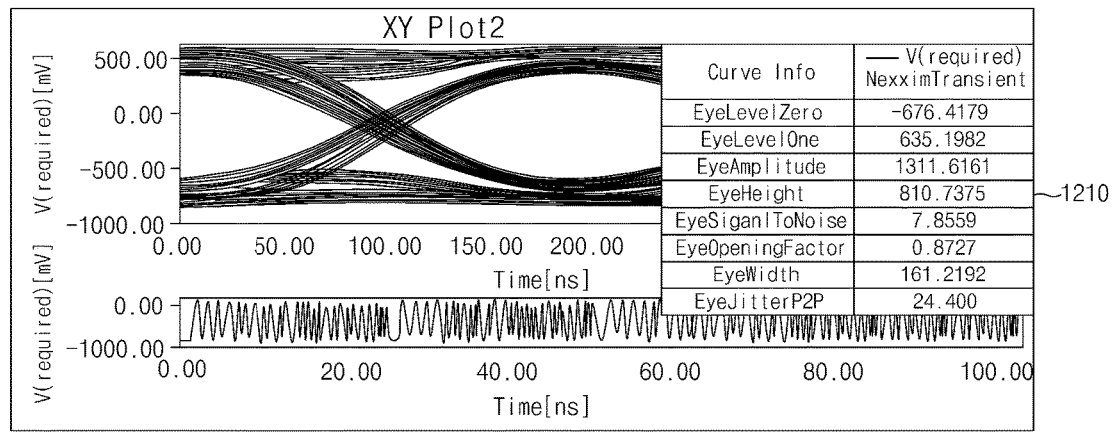
FIG. 12A is an pattern eye graph illustrating the degree of radio frequency interference when a high frequency band stop filter is used in an electronic device according to an embodiment of the present disclosure.

FIG. 12A is an pattern eye graph illustrating the degree of radio frequency interference when a high frequency band stop filter is used in an electronic device according to an embodiment of the present disclosure.

Figure 12B:
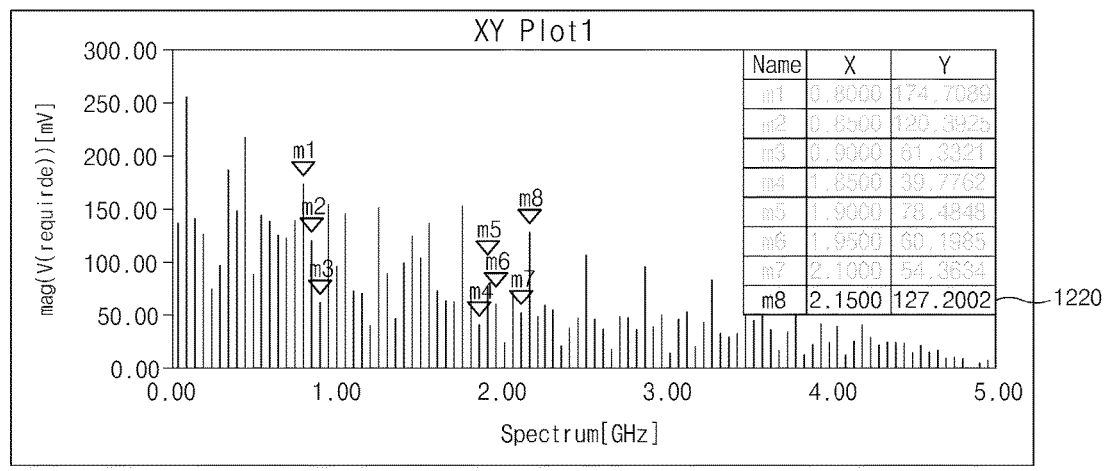
FIG. 12B is a power spectral density graph illustrating the degree of radio frequency interference when a high frequency band stop filter is used in an electronic device according to an embodiment of the present disclosure.

FIG. 12B is a power spectral density graph illustrating the degree of radio frequency interference when a high frequency band stop filter is used in an electronic device according to an embodiment of the present disclosure.

In the graph of a waveform of FIG. 12A, it may be seen that the high-speed signal is stable. Additionally, in relation to the high-speed signal, referring to the reference numeral 1210 of FIG. 12A, an eye height value of the eye pattern graph is approximately 810 mV, and referring to the reference numeral 1120 of FIG. 12B, an eye height value is approximately 127 mV at 2.15 GHz.

Accordingly, when a high frequency band stop filter is used, it may be seen that the filter reduces the size of the high-speed signal in a stable manner.

Figure 13:
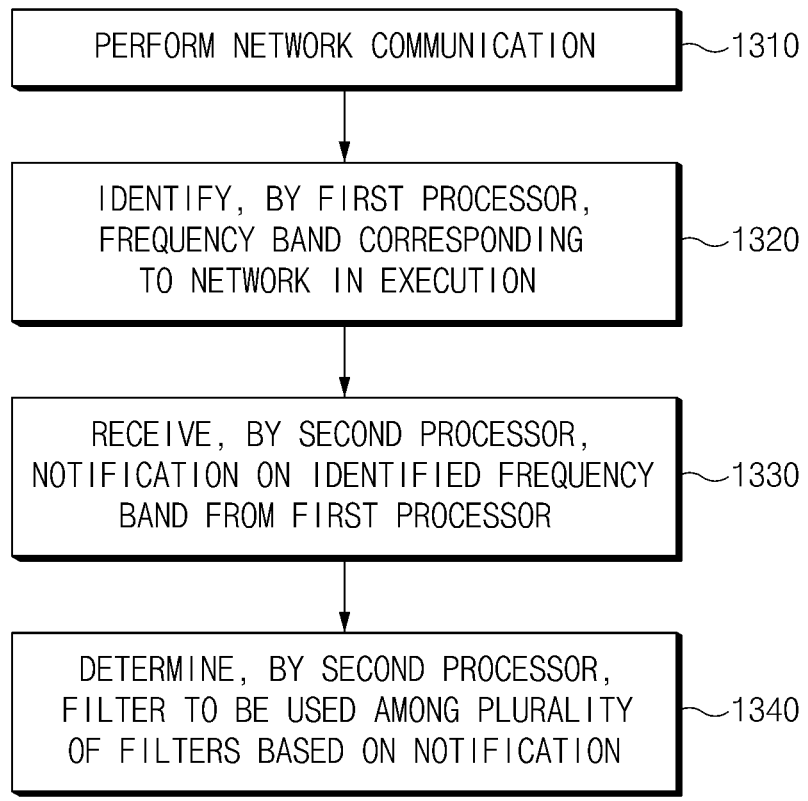
FIG. 13 is a flowchart illustrating a method for controlling radio frequency interference in an electronic device, according to an embodiment of the present disclosure.

FIG. 13 is a flowchart illustrating a method for controlling radio frequency interference in an electronic device according to an embodiment of the present disclosure. A method for controlling radio frequency interference in an electronic device shown in FIG. 13 may correspond to the operations performed by the electronic device, which are described with reference to FIGS. 1 to 12. Accordingly, even when a description is omitted below, contents described through FIGS. 1 to 12 may be used for the method of FIG. 13.

In operation 1310, a communication module of an electronic device performs network communication. An electronic device may perform communication by using one network and may perform communication by using a plurality of networks simultaneously.

In operation 1320, a first processor of the electronic device identifies a frequency band corresponding to the network performed in operation 1310. If a plurality of networks are used in operation 1310, the first processor may identify a frequency band of each of the plurality of networks.

In operation 1330, a second processor of the electronic device is notified of the frequency band that the first processor identifies in operation 1320, from the first processor. According to an embodiment of the present disclosure, operation 1320 and operation 1330 may be performed by the first processor based on a request of the second processor.

In operation 1340, the second processor of the electronic device determines at least one filter to be used among the plurality of filters, based on the notification (information) received in operation 1330. If the plurality of networks are used in operation 1310, the second processor may make a determination to use the plurality of filters.

Figure 14:
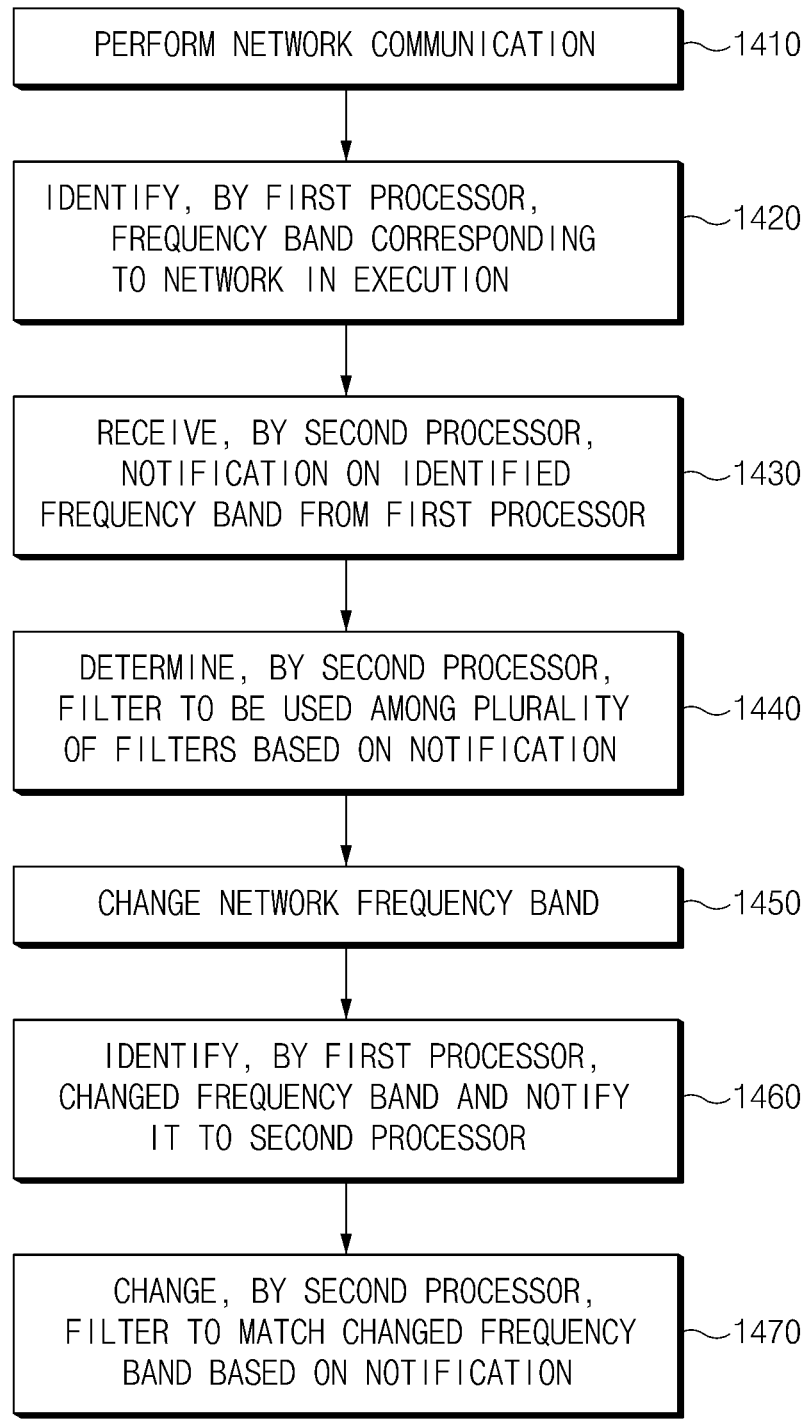
FIG. 14 is a flowchart illustrating a method for controlling radio frequency interference when a frequency that an electronic device uses is changed, according to an embodiment of the present disclosure.

FIG. 14 is a flowchart illustrating a method for controlling radio frequency interference when a frequency that an electronic device uses is changed according to an embodiment of the present disclosure.

A method for controlling radio frequency interference in an electronic device shown in FIG. 14 may correspond to the operations performed by the electronic device, which are described with reference to FIGS. 1 to 13. Accordingly, even when a description is omitted below, contents described through FIGS. 1 to 13 may be used for the method of FIG. 14.

Since operations 1410 to 1440 of FIG. 14 correspond to operations 1310 to 1340 of FIG. 13, respectively, a description thereof will be omitted.

In operation 1450, a communication module of an electronic device changes a network frequency band. For example, while performing data communication through a cellular network, an electronic device changes the communication mode to a Wi-Fi network.

In operation 1460, a first processor of the electronic device identifies a changed frequency band and notifies information on the changed frequency band to the second processor.

In operation 1470, the second processor of the electronic device receives the information on the frequency band changed in operation 1460, and changes the filter determined in operation 1440 to another filter in order to match the changed frequency band.

According to various embodiments of the present disclosure, by identifying a frequency corresponding to a network in use and controlling radio frequency interference for a corresponding frequency, a user may use multiple networks seamlessly and in a stable manner.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, and the like). The program instructions may include machine language codes generated by compilers and high-level language codes that may be executed by computers using interpreters. The above-mentioned hardware device may be configured to be operated as one or more software modules for performing operations of various embodiments of the present disclosure and vice versa.

For example, a non-transitory storage medium may store a computer readable instruction executed by at least one processor, wherein the instruction that, when executed by the at least one processor, cause the processor to perform network communication, identify, by a first processor, a frequency band corresponding to the network, receive, by a second processor, information on the frequency band from the first processor, and determine, by the second processor, a filter to be used among a plurality of filters based on the information.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a communication module configured to perform wireless communication via a network;
at least one processor electrically connected to the communication module;
a connector configured to provide an interface for a wired-connection between the electronic device and an external device; and
a plurality of filters disposed between the at least one processor and the connector,
wherein the at least one processor is configured to:
identify a frequency band corresponding to the network, and
in response to the external device being connected to the electronic device via the connector, determine at least one filter to be used among the plurality of filters based on the frequency band corresponding to the network; and
wherein the at least one processor is further configured to determine the filter when the electronic device transmits/receives data to/from the connected external device at a transfer rate of more than 5 Gbps.

2. The electronic device of claim 1, wherein the plurality of filters comprises at least of a low frequency band stop filter, a middle frequency band stop filter, and a high frequency band stop filter.

3. The electronic device of claim 2, wherein the plurality of filters are implemented with a resistor-capacitor (RC) circuit.

4. The electronic device of claim 2, wherein the plurality of filters are designed using at least one of a lumped element, an inverter, a transmission line connected to a stub, and a coupled line.

5. The electronic device of claim 1, wherein the at least one processor includes a communication processor (CP) and an application processor (AP).

6. The electronic device of claim 1, wherein when a frequency band of the wireless communication is changed, the at least one processor is configured to determine whether to change a filter based on the changed frequency band.

7. The electronic device of claim 1, wherein the at least one processor is configured to stop using the determined filter when a connection with the external device is released.

8. A method of an electronic device to control radio frequency interference, the method comprising:
performing wireless communication via a network;
identifying, by at least one processor, a frequency band corresponding to the network; and
in response to an external device being connected to the electronic device via a connector of the electronic device, determining, by the at least one processor, at least one filter to be used among a plurality of filters based on a frequency band corresponding to the network,
wherein the connector is configured to provide an interface for a wired-connection between the electronic device and the external device,
wherein the plurality of filters are disposed between the at least one processor and the connector, and
wherein determining the filter to be used by the at least one processor is performed when the electronic device transmits/receives data at a transfer rate of more than 5 Gbps to/from the external device via the connector of the electronic device.

9. The method of claim 8, wherein the plurality of filters comprise at least one of a low frequency band stop filter, a middle frequency band stop filter, and a high frequency band stop filter.

10. The method of claim 8, wherein the at least one processor includes a communication processor (CP) and an application processor (AP).

11. A non-transitory storage medium configured to store a computer readable instruction executed by at least one processor included in an electronic device, wherein the instruction when executed by the at least one processor, causes the at least one processor to:
perform wireless communication via a network;
identify a frequency band corresponding to the network; and
in response to an external device being connected to the electronic device via a connector of the electronic device, determine at least one filter to be used among a plurality of filters based on a frequency band corresponding to the network,
wherein the connector is configured to provide an interface for wired-connection between the electronic device and the external device,
wherein the plurality of filters are disposed between the at least one processor and the connector, and
wherein the instruction further causes the at least one processor to determine the filter when the electronic device transmits/receives data to/from the connected external device at a transfer rate of more than 5 Gbps.

* * * * *